Feb. 25, 1969
C. F. HARRIS
3,429,046
SINE-TEST REGISTER-ACTIVATING MECHANISM
Filed June 8, 1966
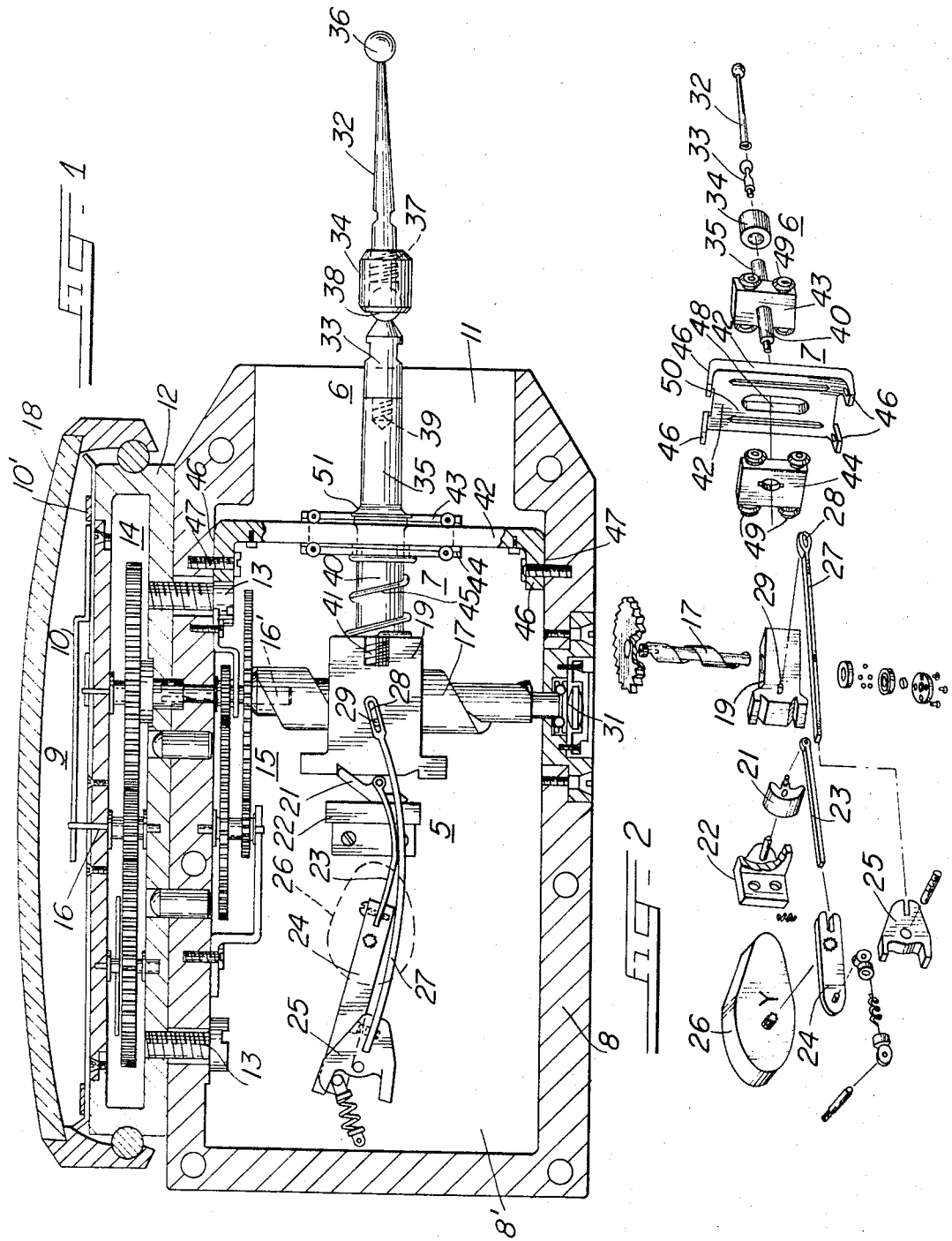
INVENTOR
CHARLES F. HARRIS
BY Rummler & Snow
ATTYS.

United States Patent Office 3,429,046
Patented Feb. 25, 1969

3,429,046
SINE-TEST REGISTER-ACTIVATING
MECHANISM
Charles F. Harris, 2717 Hampton Court,
Chicago, Ill. 60614
Filed June 8, 1966, Ser. No. 556,191
U.S. Cl. 33—172                      4 Claims
Int. Cl. G01b 3/22, 5/00

ABSTRACT OF THE DISCLOSURE

A gauging device having a test arm which rides vertically on roller plates with the rollers thereof seated in vertically aligned grooves on a mounting bracket to eliminate lateral movement. The arm at one of its ends is connected to a gauging device having a dial pointer, the other end of the arm engaging the work-piece to be tested.

---

This invention relates to improvements in gauges and particularly one that will eliminate the sine error normally found in gauges. Gauges of this type are used in machine shops to test the accuracy of a newly-machined surface.

Gauges of this general type and purpose on the market today are not accurate and admittedly so by manufacturers because each is provided with a special sine error number embossed or stamped on the housing which must be taken into account when reading the gauge to accurately reflect the true reading. It was to eliminate this sine error that the present invention was conceived.

The main objects of this invention are: to provide an improved structure and mounting of a test arm for gauges which eliminates the sine error found in gauges of this type on the present day market; to provide a device of this class wherein the testing arm rides vertically on roller plates with the rollers seated in grooves to eliminate lateral movement of the plates; and to provide an improved test-arm structure and mounting of such precise nature as will make most practical and economical its manufacturing and marketing, very facile its attachment to existing registering devices having a sine error correction, and highly gratifying the results obtained from its use.

According to one aspect embodying the principles of this invention there are provided a multiple-section arm and a mounting in the form of a slotted bracket having spaced parallel tracks thereon. The arm extends between the tracks and has supported thereon a pair of spaced plates having rollers journaled therein for engaging the tracks on the bracket mounting. The arm is connected at one of its ends to a conventional indicating mechanism and the other end is free to operate on the work-piece being tested.

In the adaptation shown in the accompanying drawings:

FIG. 1 is a vertical cross-sectional elevation of a conventional gauge of this type whereto has been attached an improved form of activating arm structured in accordance with this invention; and FIG. 2 is a reduced, exploded, perspective of the several parts of this improved activating test-arm.

The essential concept of this invention involves a multiple-section arm and the mounting thereof in the form of a vertical plate on which a pair of roller plates accurately travel in the vertical only, for use with a conventional indicator mechanism.

An improved arm and mounting, embodying the foregoing concept, for attachment to a conventional mechanism 5 for activating an indicating register 9, comprises a work-contact arm 6 and a mounting means 7 for the work arm 6.

The conventional indicating mechanism 5 generally involves a housing 8 mounting an associated dial-pointer device 9 and enclosing an operating mechanism which activates the dial-pointer device 9 by virtue of the contact of the arm 6 with the work-piece being tested.

As herein shown the housing 8 is of rectangular form provided with an open end 11 in the form of a vertical extending slot of a size to accommodate the inner end of arm 6.

The associated dial-pointer device 9 herein is shown mounted on the exterior of a hollow disk 12 secured to the housing 8 by screws 13. The disk 12 and housing 8 encloses a conventional train of gearing generally indicated by the numerals 14 and 15 respectively connected at one end to a shaft 16 of the dial-pointer 10 and at the other end to the shaft 16' which in turn is connected to a worm-drive shaft 17. A bezel 18, set over the disk 12, encloses the dial-pointer 10 and the raised boss 10' on which the gradation indicia (not shown) is incorporated.

The well-known major parts of a conventional operating mechanism 5 includes the vertically-disposed worm-drive shaft 17 with its associated helical hub 19 for causing the rotation of the worm-drive shaft 17 by pressure from the presently to be described arm 6 and mounting 7 which forms the subject matter of the invention. Associated with this helical hub 19 is a conventional form and arrangement of a "zero" return latch 21 pivotally mounted on a bracket 22 and tensioned by an "over-the-center" spring 23. The bracket is mounted on the side wall 8' of the housing. This spring 23 is attached to a rearwardly-extending arm 24 which is associated with a spring-biased detent 25 arranged to shift a switch control cam 26. The detent 25 is connected to another "over-the-center" spring 27 with a forward end slot 28 which rides a pin 29 on the hub 19. As will be noted from FIG. 1, the worm-shaft 17 is supported on a ball-bearing block 31 removably fixed in the base of the housing 8.

This improved work-contact arm 6 comprises a section 32, a trip link 33, a socket sleeve 34 and a runner-positioning shaft 35.

The section 32 is tapered rearwardly from a small-diameter and integrated work-contact ball 36 to a threaded hub 37. The trip link 33 is a short cylindrical piece, slightly tapered, with an integrated ball 38 at the forward end and a threaded stem 39 at its inner end. The sleeve 34 is of short cylindrical form internally threaded to seat the threaded end of the section 32 and oppositely recessed to embrace the ball 38 on the trip link 33, forming the conventional ball and socket connection whereby section 32 may be locked at any angle relative to the longitudinal axis of link 33.

The runner-positioning shaft 35 is a comparatively long section. It is slightly tapered forwardly from the rear end wherein is an internally threaded bore to seat the stem 39 on the link 33. The rearwardly-extending portion 40 is cylindrical in form and mounts a rear-end threaded stem 41 for seating in an internally threaded recess in the helical hub 19.

The runner-mounting means 7 comprises a support bracket 42, a pair of runner plates 43 and 44 and a position-retaining spring 45.

The support bracket 42, as most clearly shown in FIG. 2, has two pairs of integrated right angled end lugs 46 and is of an over-all dimension for transverse positioning in the housing 8 directly inwardly from the open end 11. The bracket 42 is secured in place by a number of screws 47 extending through holes in the several lugs 46 to support the bracket in vertical position. An elongated central vertical slot 48 is provided in the bracket 42, in which the shaft 35 is shiftable vertically.

The pair of runner plates 43 and 44 are centrally bored to embrace a portion of the cylindrical portion 40 of the positioning shaft 35. Pairs of rollers 49, with V-shaped peripheries or rims, are journaled on the opposite lateral edges of these plates 43 and 44 for travel in vertically extending V-shaped spaced tracks 50 formed on the inner and outer faces of the bracket 42. The V-shaped rims and V-shaped tracks are accurately formed and the rims snugly seat in the tracks but with only enough clearance that they are freely rotatable therein. As clearly shown in FIG. 1 the spring 45, interposed between the plate 44 and the hub 19, presses the plate 44 with its rollers 49 toward the inner face of the bracket 42 with its rollers in the tracks 50 and forces the outer face of plate 44 against the rim 51 on the positioning shaft 35 whereby the inner face of the plate 43 with its rollers are positioned adjacent the outer face of the bracket 42 with its rollers in the tracks 50. Thus when the work arm is shifted upwardly or downwardly, the plates 43–44 and the hub 19 simultaneously do likewise.

The unit is placed adjacent the work-piece to be tested and raised, leveled and supported so that the ball may be placed on the piece to be tested. By moving the piece of work or the device, any inaccuracies will be reflected in the register.

The roller plates carrying the work engaging arm make for, not only ease of operation, but for more accurate results. The plates have a positive vertical movement only, thus accurately reflecting and eliminating the sine error.

Although but one specific embodiment of this invention is shown and described herein, it will be understood that numerous details of the construction shown may be altered or omitted without departing from the spirit of the invention.

I claim:

1. A work-test arm and mounting, for attachment to a conventional sine test gauge which includes a register-housing enclosing a worm-drive shaft, including a helical hub, for use in testing the accuracy of a machined work-piece with a preformed pattern piece, comprising
   (a) a stationary bracket
      having a central slot formed therein and
      adapted for fixed positioning in the housing and parallel to the worm-drive shaft,
   (b) a multiple-section shaft
      extending through the bracket slot
      oppositely outward beyond the opposite faces of the bracket
      with one end attached to the helical hub,
   (c) a pair of plates
      centrally-bored and anchored to the shaft on opposite sides of the bracket and parallel to the latter,
   (d) pairs of rollers
      journaled on the plates for contactive travel on the opposite faces of the bracket,
   (e) resilient means
      embracing the shaft and pressuring the plates to hold the rollers in operative contact with the bracket, and
   (f) a work-piece contact on the other end of the shaft.

2. The device according to claim 1 wherein the rollers have V-shaped rims and the bracket has spaced vertically positioned V-shaped cooperating tracks for the travel of the rollers.

3. The device according to claim 2 which includes
   (h) an outer work-contact section
      having a ball on the outer end and
      formed with a threaded hub on its inner end,
   (i) an inner runner-positioning section
      having a threaded stem for seating in a threaded bore in the hub, and
      formed with a ball on the outer end, and
   (j) an intermediate sleeve-section
      with a socket on its inner end embracing the ball on the runner-positioning section, and
      having a threaded bore on its outer end to seat the threaded hub of the work-contact section.

4. A work-test arm and mounting for attachment to a sine test gauge which includes a register-housing enclosing a worm-drive shaft, including a helical hub, for use in testing the accuracy of a machined work-piece with a preformed pattern piece, comprising
   (a) a shaft extending horizontally outwardly from said hub,
   (b) means for mounting a pair of spaced roller means on said shaft,
   (c) spaced track means for engaging said spaced roller means, said shaft extending between said spaced track means,
   (d) means for aligning said spaced track means in vertically spaced parallel alignment,
   (e) means for pressuring said roller means against said track means, and
   (f) a work-piece contact on the other end of said shaft.

References Cited

UNITED STATES PATENTS

| | | | |
|---|---|---|---|
| 3,273,252 | 9/1966 | Bunge | 33—172 |
| 2,911,727 | 11/1959 | Steinhart | 33—174 |

LEONARD FORMAN, *Primary Examiner.*

R. A. FIELDS, *Assistant Examiner.*

U.S. Cl. X.R.

116—129